I. L. SKEITH.
SAW GUIDE.
APPLICATION FILED MAY 3, 1909.
969,810.
Patented Sept. 13, 1910.
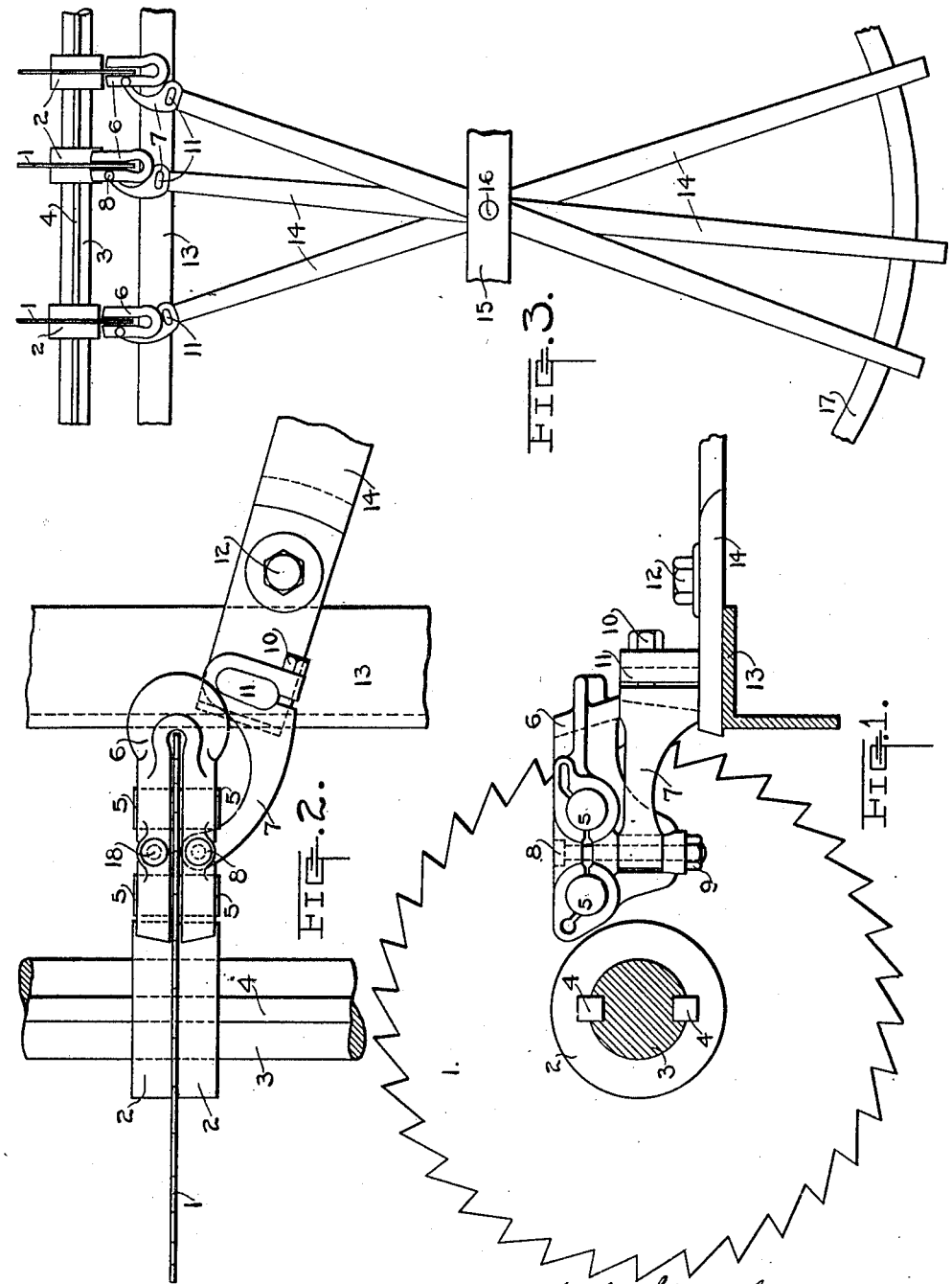
WITNESSES—
W H Lieber
Ella Brickell
INVENTOR—
I. L. Skeith
BY
ATTORNEY—

UNITED STATES PATENT OFFICE.

ISAAC L. SKEITH, OF MILWAUKEE, WISCONSIN.

SAW-GUIDE.

969,810.  Specification of Letters Patent. Patented Sept. 13, 1910.

Application filed May 3, 1909. Serial No. 493,634.

*To all whom it may concern:*

Be it known that I, ISAAC L. SKEITH, a citizen of the United States, residing at Milwaukee, in the county of Milwaukee and State of Wisconsin, have invented certain new and useful Improvements in Saw-Guides, of which the following is a specification.

This invention relates to improvements in saw shifters for gang edgers in which a series of circular saws are laterally shiftable on a common arbor.

The object of the invention is to provide a simple and efficient means for shifting and maintaining a series of saws along a common rotating shaft so that they can be set and maintained in any desired position for sawing lumber into various widths.

A clear conception of the invention can be obtained by referring to the accompanying drawings in which like reference characters designate the same parts in different views.

Figure 1 is an elevation of a saw and guide constructed according to the invention. Fig. 2 is a plan of the device shown in Fig. 1. Fig. 3 is a plan of a series of saws mounted on a common arbor, showing also the guides and shifting means therefor.

The circular saws 1 are mounted on collars 2 which are recessed so as to receive the splines 4 fastened to the shaft 3. With this arrangement, the saws 1 can be shifted to any position along the shaft 3 and still be fixed to said shaft in such a way that they will rotate as the shaft 3 rotates.

The horseshoe shaped guide 6, which embraces the saw 1, is mounted on the shifter 7 by means of a pin 8 which passes through the guide 6 parallel to the plane of the saw 1. The pins 5, of which there must be two on at least one side of a saw 1, pass through the guide 6 at right angles to the plane of the saw 1 and are clamped within the guide 6 by the bolts 8, 18, and the clamping nuts 9 at the bottoms thereof. The bolt 8 serves the double purpose of clamping the pins 5 on one side of the saw 1 into place as well as forming a pin pivot for the shifter 7. The bolt 8 is so located that the pivotal axis of the guide 6 is between the pins 5. In other words, the rectangular projection of the bolt 8 on the saw 1 must lie between the points of contact of the pins 5 with the saw 1.

The shifter 7 is mounted upon a projection 11 at the end of the shifting lever 14, and is clamped thereto by a bolt 10. The the leg portions B, and is provided with an ing material which rests upon a slide 13, the bolt 12 being a fastening means for attaching the wearing material to the lever 14. The levers 14 are pivoted at a central point by a pin 16 which passes through the frame 15. The operating ends of the levers 14 rest upon a slide 17 which may be graduated if desired.

In operating the shifter, the operating end of the lever 14 is moved to any desired position along the slide 17. This motion of the lever 14 causes the shifter 7 to swing about the pivot 16 giving motion to the guide 6. The motion of the guide 6 causes the pins 5 on one arm of the horseshoe guide 6 to bear against that side of the saw 1. This pressure of the pins 5 upon the saw 1 causes it to move along the shaft 3. The shifter guides 6 will always remain in alinement with the saw 1 since the pins 5 are located on opposite sides of the saw 1. The pivot bolt 8 being between the pins causes a balancing of pressure upon them and prevents the guide 6 from buckling.

It should be understood that it is not desired to be limited to the exact details of construction shown and described, for obvious modifications will occur to a person skilled in the art.

It is claimed and desired to secure by Letters Patent:

1. The combination of a saw, a single guide in contact on both sides of the saw and in a plurality of points on at least one side thereof, means for shifting the guide, and a pivotal connection between the guide at a plural point contact side of the saw and the shifting means, the axis of said connection being parallel to the saw and its rectangular projection on the saw lying between two of the points of plural contact.

2. The combination of a saw, a horseshoe shaped guide extending on both sides of the saw, a pair of pins extending from each arm of the guide and opposite each other and in contact with the saw, shifting means connected by pivot to the guide said pivot lying between two of said pins.

3. The combination with a single saw guide adapted to bear upon both faces of a saw and at a plurality of points upon one face, of means for shifting the guide transversely to the plane of the saw, and a pivotal connection between said guide and means, having the pivotal axis parallel to the saw's plane and lying between two of the points of plural contact.

4. The combination with a single saw guide adapted to extend along both faces of a saw, two pins projecting inwardly from one branch of the guide to the plane of the saw, a pin projecting from the other branch to the plane of the saw, and guide-shifting means pivoted to said guide between the axial lines of said two pins, the pivotal axis being parallel to the plane of the saw.

5. The combination with a horseshoe shaped saw guide having two projections extending from one branch inwardly to the plane of the saw and at least one projection similarly extending inward from the other branch, of a swinging guide-shifting arm pivoted to one of said branches between the projections borne by the branch first mentioned, the pivotal axis being parallel to the plane of the saw.

In testimony whereof, I affix my signature in the presence of two witnesses.

ISAAC L. SKEITH.

Witnesses:
H. C. CASE,
G. F. DE WEIN.